(12) United States Patent
Kim et al.

(10) Patent No.: US 8,923,750 B2
(45) Date of Patent: Dec. 30, 2014

(54) METHOD AND APPARATUS FOR TRANSMITTING SCHEDULING REQUEST IN WIRELESS COMMUNICATION SYSTEM

(75) Inventors: Hak Seong Kim, Anyang-si (KR); Joon Kui Ahn, Anyang-si (KR); Byeong Geol Cheon, Anyang-si (KR); Eun Sun Kim, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 570 days.

(21) Appl. No.: 13/133,146

(22) PCT Filed: Dec. 22, 2009

(86) PCT No.: PCT/KR2009/007680
§ 371 (c)(1),
(2), (4) Date: Jun. 6, 2011

(87) PCT Pub. No.: WO2010/074489
PCT Pub. Date: Jul. 1, 2010

(65) Prior Publication Data
US 2011/0244787 A1    Oct. 6, 2011

Related U.S. Application Data

(60) Provisional application No. 61/140,084, filed on Dec. 23, 2008, provisional application No. 61/141,223, filed on Dec. 29, 2008.

(30) Foreign Application Priority Data

Sep. 1, 2009  (KR) ................. 10-2009-0081773

(51) Int. Cl.
*H04B 3/36* (2006.01)
*H04B 7/14* (2006.01)
*H04W 72/12* (2009.01)
*H04B 7/155* (2006.01)
*H04B 7/26* (2006.01)
*H04W 84/04* (2009.01)

(52) U.S. Cl.
CPC ....... *H04W 72/1284* (2013.01); *H04B 7/15528* (2013.01); *H04B 7/2606* (2013.01); *H04W 84/047* (2013.01)
USPC ............. 455/7; 455/11.1; 455/15; 455/422.1; 455/450; 455/455; 455/456.5; 370/252; 370/312; 370/329; 370/492; 370/501

(58) Field of Classification Search
CPC ............ H04B 7/15528; H04B 7/2606; H04W 72/1284; H04W 84/047
USPC .............. 455/7, 3.05, 9, 11.1, 15, 422.1, 450, 455/452.2, 455, 456.2, 456.5; 370/252, 370/310, 312, 315, 329, 336, 492, 501
See application file for complete search history.

(56) References Cited

U.S. PATENT DOCUMENTS

2008/0070582 A1    3/2008  Cai
2008/0080472 A1*   4/2008  Bertrand et al. .............. 370/344
(Continued)

*Primary Examiner* — Shaima Q Aminzay
(74) *Attorney, Agent, or Firm* — Lee, Hong, Degerman, Kang & Waimey

(57) ABSTRACT

A method of transmitting a scheduling request in a wireless communication system is provided. The method includes: transmitting a scheduling request signal by a relay station to a base station in a first subframe; and transmitting data by the relay station to the base station in a second subframe, wherein the scheduling request signal includes allocation information on the second subframe in which the data is transmitted. Accordingly, data can be effective transmitted between the relay station and the base station in the wireless communication system.

13 Claims, 15 Drawing Sheets

(56) References Cited

U.S. PATENT DOCUMENTS

| | | |
|---|---|---|
| 2008/0108304 A1 | 5/2008 | Suga |
| 2008/0248793 A1* | 10/2008 | Chang et al. ............... 455/422.1 |
| 2008/0259857 A1 | 10/2008 | Zheng et al. |
| 2010/0080166 A1* | 4/2010 | Palanki et al. ................ 370/315 |
| 2011/0310821 A1* | 12/2011 | Kim et al. ..................... 370/329 |
| 2012/0002593 A1* | 1/2012 | Kim et al. ..................... 370/315 |

* cited by examiner

Fig. 6

| Subframe index | Backhaul Downlink | Access Downlink SCH(n) | HP1 | HP2 | HP3 | HP4 | Relay DL Tx | Relay UL Rx | Access Uplink (n+4) | HP1 | HP2 | HP3 | HP4 | Backhaul Uplink | Subframe index |
|---|---|---|---|---|---|---|---|---|---|---|---|---|---|---|---|
| 0 |  | 1 | 1 |  |  | 1 | 1 |  |  | 1 |  |  |  | 0 |
| 1 | 0 |  |  |  |  | 0 | 0 |  |  |  |  |  | 0 | 1 |
| 2 |  |  |  |  | 1 | 1 | 1 |  |  |  |  | 1 |  | 2 |
| 3 | 0 |  |  |  |  | 0 | 1 | 1 |  |  |  |  | 0 | 3 |
| 4 |  | 1 |  | 1 |  | 1 | 1 | 1 | 1 |  |  |  |  | 4 |
| 5 |  | 1 |  |  |  | 1 | 0 |  |  |  |  |  | 0 | 5 |
| 6 |  |  |  |  | 1 | 1 | 1 |  |  |  | 1 |  |  | 6 |
| 7 | 0 |  |  |  |  | 0 | 0 |  |  |  |  |  | 0 | 7 |
| 8 |  |  | 1 |  |  | 1 | 1 | 1 |  | 1 |  |  |  | 8 |
| 9 |  | 1 |  |  |  | 1 | 1 | 1 |  |  |  |  |  | 9 |
| 10 |  | 1 |  | 1 |  | 1 | 1 |  |  |  |  | 1 |  | 10 |
| 11 | 0 |  |  |  |  | 0 | 0 |  |  |  |  |  | 0 | 11 |
| 12 |  |  | 1 |  |  | 1 | 1 |  | 1 |  |  |  |  | 12 |
| 13 | 0 |  |  |  |  | 0 | 1 | 1 |  |  |  |  | 0 | 13 |
| 14 |  | 1 |  |  | 1 | 1 | 1 | 1 |  |  | 1 |  |  | 14 |
| 15 |  | 1 |  |  |  | 1 | 0 |  |  |  |  |  | 0 | 15 |
| 16 |  |  | 1 |  |  | 1 | 1 |  | 1 |  |  |  |  | 16 |
| 17 | 0 |  |  |  |  | 0 | 0 |  |  |  |  |  | 0 | 17 |
| 18 |  |  |  | 1 |  | 1 | 1 | 1 |  |  |  | 1 |  | 18 |
| 19 |  | 1 |  |  |  | 1 | 1 | 1 |  |  |  |  |  | 19 |
| 20 |  | 1 | 1 |  |  | 1 | 1 |  | 1 |  |  |  |  | 20 |
| 21 | 0 |  |  |  |  | 0 | 0 |  |  |  |  |  | 0 | 21 |
| 22 |  |  |  |  | 1 | 1 | 1 |  |  |  | 1 |  |  | 22 |
| 23 | 0 |  |  |  |  | 0 | 1 | 1 |  |  |  |  | 0 | 23 |
| 24 |  | 1 | 1 |  |  | 1 | 1 | 1 | 1 |  |  |  |  | 24 |
| 25 |  | 1 |  |  |  | 1 | 0 |  |  |  |  |  | 0 | 25 |
| 26 |  |  |  | 1 |  | 1 | 1 |  |  |  | 1 |  |  | 26 |
| 27 | 0 |  |  |  |  | 0 | 0 |  |  |  |  |  | 0 | 27 |
| 28 |  |  | 1 |  |  | 1 | 1 | 1 | 1 |  |  |  |  | 28 |
| 29 |  | 1 |  |  |  | 1 | 1 | 1 |  |  |  |  |  | 29 |
| 30 |  | 1 |  |  | 1 | 1 | 1 |  |  |  | 1 |  |  | 30 |
| 31 | 0 |  |  |  |  | 0 | 0 |  |  |  |  |  | 0 | 31 |
| 32 |  |  | 1 |  |  | 1 | 1 |  | 1 |  |  |  |  | 32 |
| 33 | 0 |  |  |  |  | 0 | 1 | 1 |  |  |  |  | 0 | 33 |
| 34 |  | 1 |  | 1 |  | 1 | 1 | 1 |  |  |  | 1 |  | 34 |
| 35 |  | 1 |  |  |  | 1 | 0 |  |  |  |  |  | 0 | 35 |
| 36 |  |  | 1 |  |  | 1 | 1 |  | 1 |  |  |  |  | 36 |
| 37 | 0 |  |  |  |  | 0 | 0 |  |  |  |  |  | 0 | 37 |
| 38 |  |  |  |  | 1 | 1 | 1 | 1 |  |  | 1 |  |  | 38 |
| 39 |  | 1 |  |  |  | 1 | 1 | 1 |  |  |  |  |  | 39 |

Fig. 7

| Subframe index | Backhaul Downlink | Access Downlink SCH (n) | HP1 | HP2 | HP3 | HP4 | Relay DL Tx | Access Uplink Relay (n+4) UL Rx | HP1 | HP2 | HP3 | HP4 | Backhaul Uplink | Subframe index |
|---|---|---|---|---|---|---|---|---|---|---|---|---|---|---|
| 0 |   | 1 | 1 |   |   |   | 1 | 1 |   | 1 |   |   |   | 0 |
| 1 | 0 |   |   |   |   |   | 0 | 0 |   |   |   |   | 0 | 1 |
| 2 |   |   |   |   | 1 |   | 1 | 1 |   |   |   | 1 |   | 2 |
| 3 | 0 |   |   |   |   |   | 0 | 1 | 1 |   |   |   |   | 3 |
| 4 |   | 1 |   | 1 |   |   | 1 | 1 | 1 | 1 |   |   |   | 4 |
| 5 |   | 1 |   |   |   |   | 1 | 0 |   |   |   |   | 0 | 5 |
| 6 | 0 |   |   |   |   |   | 0 | 1 |   |   | 1 |   |   | 6 |
| 7 | 0 |   |   |   |   |   | 0 | 0 |   |   |   |   | 0 | 7 |
| 8 |   |   | 1 |   |   |   | 1 | 1 | 1 | 1 |   |   |   | 8 |
| 9 |   | 1 |   |   |   |   | 1 | 1 | 1 |   |   |   |   | 9 |
| 10 |   | 1 |   |   | 1 |   | 1 | 1 |   |   |   | 1 |   | 10 |
| 11 | 0 |   |   |   |   |   | 0 | 0 |   |   |   |   | 0 | 11 |
| 12 |   |   |   | 1 |   |   | 1 | 1 |   | 1 |   |   |   | 12 |
| 13 | 0 |   |   |   |   |   | 0 | 1 | 1 |   |   |   |   | 13 |
| 14 |   | 1 |   |   |   |   | 1 | 1 | 1 |   | 1 |   |   | 14 |
| 15 |   | 1 |   |   |   |   | 1 | 0 |   |   |   |   | 0 | 15 |
| 16 |   |   | 1 |   |   |   | 1 | 1 |   | 1 |   |   |   | 16 |
| 17 | 0 |   |   |   |   |   | 0 | 0 |   |   |   |   | 0 | 17 |
| 18 |   |   |   |   | 1 |   | 1 | 1 | 1 |   |   | 1 |   | 18 |
| 19 |   | 1 |   |   |   |   | 1 | 1 | 1 |   |   |   |   | 19 |
| 20 |   | 1 |   | 1 |   |   | 1 | 1 |   | 1 |   |   |   | 20 |
| 21 | 0 |   |   |   |   |   | 0 | 0 |   |   |   |   | 0 | 21 |
| 22 | 0 |   |   |   |   |   | 0 | 1 |   |   | 1 |   |   | 22 |
| 23 | 0 |   |   |   |   |   | 0 | 1 | 1 |   |   |   |   | 23 |
| 24 |   | 1 | 1 |   |   |   | 1 | 1 | 1 | 1 |   |   |   | 24 |
| 25 |   | 1 |   |   |   |   | 1 | 0 |   |   |   |   | 0 | 25 |
| 26 |   |   |   |   | 1 |   | 1 | 1 |   |   |   | 1 |   | 26 |
| 27 | 0 |   |   |   |   |   | 0 | 0 |   |   |   |   | 0 | 27 |
| 28 |   |   |   | 1 |   |   | 1 | 1 | 1 | 1 |   |   |   | 28 |
| 29 |   | 1 |   |   |   |   | 1 | 1 | 1 |   |   |   |   | 29 |
| 30 |   | 1 |   |   |   |   | 1 | 1 |   |   | 1 |   |   | 30 |
| 31 | 0 |   |   |   |   |   | 0 | 0 |   |   |   |   | 0 | 31 |
| 32 |   |   | 1 |   |   |   | 1 | 1 |   | 1 |   |   |   | 32 |
| 33 | 0 |   |   |   |   |   | 0 | 1 | 1 |   |   |   |   | 33 |
| 34 |   | 1 |   |   | 1 |   | 1 | 1 | 1 |   |   | 1 |   | 34 |
| 35 |   | 1 |   |   |   |   | 1 | 0 |   |   |   |   | 0 | 35 |
| 36 |   |   |   | 1 |   |   | 1 | 1 |   | 1 |   |   |   | 36 |
| 37 | 0 |   |   |   |   |   | 0 | 0 |   |   |   |   | 0 | 37 |
| 38 | 0 |   |   |   |   |   | 0 | 1 | 1 |   | 1 |   |   | 38 |
| 39 |   | 1 |   |   |   |   | 1 | 1 | 1 |   |   |   |   | 39 |

Fig. 8

| Subframe index | Backhaul Downlink | Access Downlink | | | | | | Access Uplink | | | | | | Backhaul Uplink | Subframe index |
|---|---|---|---|---|---|---|---|---|---|---|---|---|---|---|---|
| | | SCH (n) | HP1 | HP2 | HP3 | HP4 | Relay DL Tx | Relay UL Rx | (n+4) | HP1 | HP2 | HP3 | HP4 | | |
| 0 | | 1 | 1 | | | | 1 | 1 | | | 1 | | | | 0 |
| 1 | 0 | | | | | | 0 | 0 | | | | | | 0 | 1 |
| 2 | | | | | | | 0 | 1 | | | | | 1 | | 2 |
| 3 | 0 | | | | | | 0 | 1 | 1 | | | | | | 3 |
| 4 | | 1 | | 1 | | | 1 | 1 | 1 | 1 | | | | | 4 |
| 5 | | 1 | | | | | 1 | 0 | | | | | | 0 | 5 |
| 6 | 0 | | | | | | 0 | 1 | | | | 1 | | | 6 |
| 7 | 0 | | | | | | 0 | 0 | | | | | | 0 | 7 |
| 8 | | | 1 | | | | 1 | 1 | 1 | | 1 | | | | 8 |
| 9 | | 1 | | | | | 1 | 1 | 1 | | | | | | 9 |
| 10 | | 1 | | | | | 1 | 1 | | | | | 1 | | 10 |
| 11 | 0 | | | | | | 0 | 0 | | | | | | 0 | 11 |
| 12 | | | | 1 | | | 1 | 1 | | 1 | | | | | 12 |
| 13 | 0 | | | | | | 0 | 1 | 1 | | | | | | 13 |
| 14 | | 1 | | | | | 1 | 1 | 1 | | | 1 | | | 14 |
| 15 | | 1 | | | | | 1 | 0 | | | | | | 0 | 15 |
| 16 | | | 1 | | | | 1 | 1 | | | 1 | | | | 16 |
| 17 | 0 | | | | | | 0 | 0 | | | | | | 0 | 17 |
| 18 | 0 | | | | | | 0 | 1 | 1 | | | | 1 | | 18 |
| 19 | | 1 | | | | | 1 | 1 | 1 | | | | | | 19 |
| 20 | | 1 | 1 | | | | 1 | 1 | | 1 | | | | | 20 |
| 21 | 0 | | | | | | 0 | 0 | | | | | | 0 | 21 |
| 22 | 0 | | | | | | 0 | 1 | | | | 1 | | | 22 |
| 23 | 0 | | | | | | 0 | 1 | 1 | | | | | | 23 |
| 24 | | 1 | 1 | | | | 1 | 1 | 1 | | 1 | | | | 24 |
| 25 | | 1 | | | | | 1 | 0 | | | | | | 0 | 25 |
| 26 | 0 | | | | | | 0 | 1 | | | | | 1 | | 26 |
| 27 | 0 | | | | | | 0 | 0 | | | | | | 0 | 27 |
| 28 | | | | 1 | | | 1 | 1 | 1 | 1 | | | | | 28 |
| 29 | | 1 | | | | | 1 | 1 | 1 | | | | | | 29 |
| 30 | | 1 | | | | | 1 | 1 | | | | 1 | | | 30 |
| 31 | 0 | | | | | | 0 | 0 | | | | | | 0 | 31 |
| 32 | | | 1 | | | | 1 | 1 | | | 1 | | | | 32 |
| 33 | 0 | | | | | | 0 | 1 | 1 | | | | | | 33 |
| 34 | | 1 | | | | | 1 | 1 | 1 | | | | 1 | | 34 |
| 35 | | 1 | | | | | 1 | 0 | | | | | | 0 | 35 |
| 36 | | | | 1 | | | 1 | 1 | | 1 | | | | | 36 |
| 37 | 0 | | | | | | 0 | 0 | | | | | | 0 | 37 |
| 38 | 0 | | | | | | 0 | 1 | 1 | | | 1 | | | 38 |
| 39 | | 1 | | | | | 1 | 1 | 1 | | | | | | 39 |

Fig. 9

| Subframe index | Backhaul Downlink | Access Downlink | | | | | | Access Uplink | | | | | | Backhaul Uplink | Subframe index |
|---|---|---|---|---|---|---|---|---|---|---|---|---|---|---|---|
| | | SCH(n) | HP1 | HP2 | HP3 | HP4 | Relay DL Tx | Relay UL Rx | (n+4) | HP1 | HP2 | HP3 | HP4 | | |
| 0 | | 1 | 1 | | | | 1 | 1 | | | 1 | | | | 0 |
| 1 | 0 | | | | | | 0 | 0 | | | | | | 0 | 1 |
| 2 | | | | | | | 0 | 1 | | | | | 1 | | 2 |
| 3 | 0 | | | | | | 0 | 1 | 1 | | | | | | 3 |
| 4 | | 1 | | | | | 1 | 1 | 1 | 1 | | | | | 4 |
| 5 | | 1 | | | | | 1 | 0 | | | | | | 0 | 5 |
| 6 | 0 | | | | | | 0 | 1 | | | | 1 | | | 6 |
| 7 | 0 | | | | | | 0 | 0 | | | | | | 0 | 7 |
| 8 | | | 1 | | | | 1 | 1 | 1 | | 1 | | | | 8 |
| 9 | | 1 | | | | | 1 | 1 | 1 | | | | | | 9 |
| 10 | | 1 | | | | | 1 | 1 | | | | | 1 | | 10 |
| 11 | 0 | | | | | | 0 | 0 | | | | | | 0 | 11 |
| 12 | 0 | | | | | | 0 | 1 | | 1 | | | | | 12 |
| 13 | 0 | | | | | | 0 | 1 | 1 | | | | | | 13 |
| 14 | | 1 | | | | | 1 | 1 | 1 | | | 1 | | | 14 |
| 15 | | 1 | | | | | 1 | 0 | | | | | | 0 | 15 |
| 16 | | | 1 | | | | 1 | 1 | | | 1 | | | | 16 |
| 17 | 0 | | | | | | 0 | 0 | | | | | | 0 | 17 |
| 18 | 0 | | | | | | 0 | 1 | 1 | | | | 1 | | 18 |
| 19 | | 1 | | | | | 1 | 1 | 1 | | | | | | 19 |
| 20 | | 1 | | | | | 1 | 1 | | 1 | | | | | 20 |
| 21 | 0 | | | | | | 0 | 0 | | | | | | 0 | 21 |
| 22 | 0 | | | | | | 0 | 1 | | | | 1 | | | 22 |
| 23 | 0 | | | | | | 0 | 1 | 1 | | | | | | 23 |
| 24 | | 1 | 1 | | | | 1 | 1 | 1 | | 1 | | | | 24 |
| 25 | | 1 | | | | | 1 | 0 | | | | | | 0 | 25 |
| 26 | 0 | | | | | | 0 | 1 | | | | | 1 | | 26 |
| 27 | 0 | | | | | | 0 | 0 | | | | | | 0 | 27 |
| 28 | 0 | | | | | | 0 | 1 | 1 | 1 | | | | | 28 |
| 29 | | 1 | | | | | 1 | 1 | 1 | | | | | | 29 |
| 30 | | 1 | | | | | 1 | 1 | | | | 1 | | | 30 |
| 31 | 0 | | | | | | 0 | 0 | | | | | | 0 | 31 |
| 32 | | | 1 | | | | 1 | 1 | | | 1 | | | | 32 |
| 33 | 0 | | | | | | 0 | 1 | 1 | | | | | | 33 |
| 34 | | 1 | | | | | 1 | 1 | 1 | | | | 1 | | 34 |
| 35 | | 1 | | | | | 1 | 0 | | | | | | 0 | 35 |
| 36 | 0 | | | | | | 0 | 1 | | 1 | | | | | 36 |
| 37 | 0 | | | | | | 0 | 0 | | | | | | 0 | 37 |
| 38 | 0 | | | | | | 0 | 1 | 1 | | | 1 | | | 38 |
| 39 | | 1 | | | | | 1 | 1 | 1 | | | | | | 39 |

Fig. 10

| Subframe index | Backhaul Downlink | SCH(n) | HP1 | HP2 | HP3 | HP4 | Relay DL Tx | Relay UL Rx | (n+4) | HP1 | HP2 | HP3 | HP4 | Backhaul Uplink | Subframe index |
|---|---|---|---|---|---|---|---|---|---|---|---|---|---|---|---|
| 0 | | 1 | 1 | | | | 1 | 1 | | | 1 | | | | 0 |
| 1 | 0 | | | | | | 0 | 0 | | | | | | 0 | 1 |
| 2 | | | | | 1 | | 1 | 0 | | | | | | 0 | 2 |
| 3 | 0 | | | | | | 0 | 1 | 1 | | | | | | 3 |
| 4 | | 1 | | 1 | | | 1 | 1 | 1 | 1 | | | | | 4 |
| 5 | | 1 | | | | | 1 | 0 | | | | | | 0 | 5 |
| 6 | | | | | | 1 | 1 | 0 | | | | | | 0 | 6 |
| 7 | 0 | | | | | | 0 | 0 | | | | | | 0 | 7 |
| 8 | | | 1 | | | | 1 | 1 | 1 | | 1 | | | | 8 |
| 9 | | 1 | | | | | 1 | 1 | 1 | | | | | | 9 |
| 10 | | 1 | | | 1 | | 1 | 0 | | | | | | 0 | 10 |
| 11 | 0 | | | | | | 0 | 0 | | | | | | 0 | 11 |
| 12 | | | | 1 | | | 1 | 1 | | 1 | | | | | 12 |
| 13 | 0 | | | | | | 0 | 1 | 1 | | | | | | 13 |
| 14 | | 1 | | | | 1 | 1 | 1 | 1 | | | | | | 14 |
| 15 | | 1 | | | | | 1 | 0 | | | | | | 0 | 15 |
| 16 | | | 1 | | | | 1 | 1 | | | 1 | | | | 16 |
| 17 | 0 | | | | | | 0 | 0 | | | | | | 0 | 17 |
| 18 | | | | | 1 | | 1 | 1 | 1 | | | | | | 18 |
| 19 | | 1 | | | | | 1 | 1 | 1 | | | | | | 19 |
| 20 | | 1 | 1 | | | | 1 | 1 | | 1 | | | | | 20 |
| 21 | 0 | | | | | | 0 | 0 | | | | | | 0 | 21 |
| 22 | | | | | 1 | | 1 | 0 | | | | | | 0 | 22 |
| 23 | 0 | | | | | | 0 | 1 | 1 | | | | | | 23 |
| 24 | | 1 | 1 | | | | 1 | 1 | 1 | | 1 | | | | 24 |
| 25 | | 1 | | | | | 1 | 0 | | | | | | 0 | 25 |
| 26 | | | | | 1 | | 1 | 0 | | | | | | 0 | 26 |
| 27 | 0 | | | | | | 0 | 0 | | | | | | 0 | 27 |
| 28 | | | 1 | | | | 1 | 1 | 1 | 1 | | | | | 28 |
| 29 | | 1 | | | | | 1 | 1 | 1 | | | | | | 29 |
| 30 | | 1 | | | | 1 | 1 | 0 | | | | | | 0 | 30 |
| 31 | 0 | | | | | | 0 | 0 | | | | | | 0 | 31 |
| 32 | | | 1 | | | | 1 | 1 | | | 1 | | | | 32 |
| 33 | 0 | | | | | | 0 | 1 | 1 | | | | | | 33 |
| 34 | | 1 | | 1 | | | 1 | 1 | 1 | | | | | | 34 |
| 35 | | 1 | | | | | 1 | 0 | | | | | | 0 | 35 |
| 36 | | | | 1 | | | 1 | 1 | | 1 | | | | | 36 |
| 37 | 0 | | | | | | 0 | 0 | | | | | | 0 | 37 |
| 38 | | | | | | 1 | 1 | 1 | 1 | | | | | | 38 |
| 39 | | 1 | | | | | 1 | 1 | 1 | | | | | | 39 |

Fig. 11

| Subframe index | Backhaul Downlink | Access Downlink | | | | | | Access Uplink | | | | | | Backhaul Uplink | Subframe index |
|---|---|---|---|---|---|---|---|---|---|---|---|---|---|---|---|
| | | SCH (n) | HP1 | HP2 | HP3 | HP4 | Relay DL Tx | Relay UL Rx | (n+4) | HP1 | HP2 | HP3 | HP4 | | |
| 0 | | 1 | 1 | | | | 1 | 1 | | | 1 | | | | 0 |
| 1 | 0 | | | | | | 0 | 0 | | | | | | 0 | 1 |
| 2 | | | | | 1 | | 1 | 0 | | | | | | 0 | 2 |
| 3 | 0 | | | | | | 0 | 1 | 1 | | | | | | 3 |
| 4 | | 1 | | 1 | | | 1 | 1 | 1 | 1 | | | | | 4 |
| 5 | | 1 | | | | | 1 | 0 | | | | | | 0 | 5 |
| 6 | | | | | | 1 | 1 | 0 | | | | | | 0 | 6 |
| 7 | 0 | | | | | | 0 | 0 | | | | | | 0 | 7 |
| 8 | | | 1 | | | | 1 | 1 | 1 | | 1 | | | | 8 |
| 9 | | 1 | | | | | 1 | 1 | 1 | | | | | | 9 |
| 10 | | 1 | | | 1 | | 1 | 0 | | | | | | 0 | 10 |
| 11 | 0 | | | | | | 0 | 0 | | | | | | 0 | 11 |
| 12 | | | | 1 | | | 1 | 1 | | 1 | | | | | 12 |
| 13 | 0 | | | | | | 0 | 1 | 1 | | | | | | 13 |
| 14 | | 1 | | | 1 | 1 | 1 | 1 | 1 | | | | | | 14 |
| 15 | | 1 | | | | | 1 | 0 | | | | | | 0 | 15 |
| 16 | | | 1 | | | | 1 | 1 | | | 1 | | | | 16 |
| 17 | 0 | | | | | | 0 | 0 | | | | | | 0 | 17 |
| 18 | | | | | 1 | | 1 | 1 | 1 | | | | | | 18 |
| 19 | | 1 | | | | | 1 | 1 | 1 | | | | | | 19 |
| 20 | | 1 | 1 | | | | 1 | 1 | | 1 | | | | | 20 |
| 21 | 0 | | | | | | 0 | 0 | | | | | | 0 | 21 |
| 22 | | | | | | 1 | 1 | 0 | | | | | | 0 | 22 |
| 23 | 0 | | | | | | 0 | 1 | 1 | | | | | | 23 |
| 24 | | 1 | 1 | | | | 1 | 1 | 1 | 1 | | | | | 24 |
| 25 | | 1 | | | | | 1 | 0 | | | | | | 0 | 25 |
| 26 | | | | | 1 | | 1 | 0 | | | | | | 0 | 26 |
| 27 | 0 | | | | | | 0 | 0 | | | | | | 0 | 27 |
| 28 | | | | 1 | | | 1 | 1 | 1 | 1 | | | | | 28 |
| 29 | | 1 | | | | | 1 | 1 | 1 | | | | | | 29 |
| 30 | | 1 | | | | 1 | 1 | 0 | | | | | | 0 | 30 |
| 31 | 0 | | | | | | 0 | 0 | | | | | | 0 | 31 |
| 32 | | | 1 | | | | 1 | 1 | | | 1 | | | | 32 |
| 33 | 0 | | | | | | 0 | 1 | 1 | | | | | | 33 |
| 34 | | 1 | | 1 | | | 1 | 1 | 1 | | | | | | 34 |
| 35 | | 1 | | | | | 1 | 0 | | | | | | 0 | 35 |
| 36 | | | | 1 | | | 1 | 1 | | 1 | | | | | 36 |
| 37 | 0 | | | | | | 0 | 0 | | | | | | 0 | 37 |
| 38 | | | | | | 1 | 1 | 1 | 1 | | | | | | 38 |
| 39 | | 1 | | | | | 1 | 1 | 1 | | | | | | 39 |

Fig. 12

| Subframe index | Backhaul Downlink | Access Downlink | | | | | | Access Uplink | | | | | | Backhaul Uplink | Subframe index |
|---|---|---|---|---|---|---|---|---|---|---|---|---|---|---|---|
| | | SCH (n) | HP1 | HP2 | HP3 | HP4 | Relay DL Tx | Relay UL Rx | (n+4) | HP1 | HP2 | HP3 | HP4 | | |
| 0 | | 1 | 1 | | | | 1 | 1 | | | | | | 0 | 0 |
| 1 | 0 | | | | | | 0 | 0 | | | | | | 0 | 1 |
| 2 | | | | | 1 | | 1 | 0 | | | | | | 0 | 2 |
| 3 | 0 | | | | | | 0 | 1 | 1 | | | | | | 3 |
| 4 | | 1 | | 1 | | | 1 | 1 | 1 | 1 | | | | | 4 |
| 5 | | 1 | | | | | 1 | 0 | | | | | | 0 | 5 |
| 6 | | | | | | 1 | 1 | 0 | | | | | | 0 | 6 |
| 7 | 0 | | | | | | 0 | 0 | | | | | | 0 | 7 |
| 8 | | | 1 | | | | 1 | 1 | 1 | | | | | | 8 |
| 9 | | 1 | | | | | 1 | 1 | 1 | | | | | | 9 |
| 10 | | 1 | | | 1 | | 1 | 0 | | | | | | 0 | 10 |
| 11 | 0 | | | | | | 0 | 0 | | | | | | 0 | 11 |
| 12 | | | | 1 | | | 1 | 1 | | 1 | | | | | 12 |
| 13 | 0 | | | | | | 0 | 1 | 1 | | | | | | 13 |
| 14 | | 1 | | | | 1 | 1 | 1 | 1 | | | | | | 14 |
| 15 | | 1 | | | | | 1 | 0 | | | | | | 0 | 15 |
| 16 | | | 1 | | | | 1 | 1 | | | | | | 0 | 16 |
| 17 | 0 | | | | | | 0 | 0 | | | | | | 0 | 17 |
| 18 | | | | | 1 | | 1 | 1 | 1 | | | | | | 18 |
| 19 | | 1 | | | | | 1 | 1 | 1 | | | | | | 19 |
| 20 | | 1 | | 1 | | | 1 | 1 | | 1 | | | | | 20 |
| 21 | 0 | | | | | | 0 | 0 | | | | | | 0 | 21 |
| 22 | | | | | 1 | | 1 | 0 | | | | | | 0 | 22 |
| 23 | 0 | | | | | | 0 | 1 | 1 | | | | | | 23 |
| 24 | | 1 | 1 | | | | 1 | 1 | 1 | | | | | | 24 |
| 25 | | 1 | | | | | 1 | 0 | | | | | | 0 | 25 |
| 26 | | | | | 1 | | 1 | 0 | | | | | | 0 | 26 |
| 27 | 0 | | | | | | 0 | 0 | | | | | | 0 | 27 |
| 28 | | | | 1 | | | 1 | 1 | 1 | 1 | | | | | 28 |
| 29 | | 1 | | | | | 1 | 1 | 1 | | | | | | 29 |
| 30 | | 1 | | | | 1 | 1 | 0 | | | | | | 0 | 30 |
| 31 | 0 | | | | | | 0 | 0 | | | | | | 0 | 31 |
| 32 | | | 1 | | | | 1 | 1 | | | | | | 0 | 32 |
| 33 | 0 | | | | | | 0 | 1 | 1 | | | | | | 33 |
| 34 | | 1 | | | 1 | | 1 | 1 | 1 | | | | | | 34 |
| 35 | | 1 | | | | | 1 | 0 | | | | | | 0 | 35 |
| 36 | | | | 1 | | | 1 | 1 | | 1 | | | | | 36 |
| 37 | 0 | | | | | | 0 | 0 | | | | | | 0 | 37 |
| 38 | | | | | | 1 | 1 | 1 | 1 | | | | | | 38 |
| 39 | | 1 | | | | | 1 | 1 | 1 | | | | | | 39 |

METHOD AND APPARATUS FOR TRANSMITTING SCHEDULING REQUEST IN WIRELESS COMMUNICATION SYSTEM

CROSS-REFERENCE TO RELATED APPLICATIONS

This application is a National Stage filing under 35 U.S.C. 371 of International Application No. PCT/KR2009/007680, filed on Dec. 22, 2009, which claims the benefit of earlier filing date and right of priority to Korean Application No. 10-2009-0081773, filed on Sep. 1, 2009, and also claims the benefit of U.S. Provisional Application Serial Nos. 61/141,223, filed on Dec. 29, 2008, and 61/140,084, filed on Dec. 23, 2008, the contents of which are all hereby incorporated by reference herein in their entirety.

TECHNICAL FIELD

The present invention relates to wireless communications, and more particularly, to a method and apparatus for transmitting a scheduling request by a relay station in a wireless communication system.

BACKGROUND ART

The conventional wireless communication system includes a mobile station (MS) and a base station (BS) providing a service in a specific region (i.e., a cell). Quality of a signal transmitted through a wireless channel between the MS and the BS may be affected by changes in a wireless environment. In particular, due to various factors in a surrounding environment, such as scatters, movement of the MS, or the like, the wireless channel changes over time. In addition, there is a restriction in terms of distance since reception power is rapidly decreased in proportion to a distance between wireless communication entities. Therefore, in general, the MS can communicate with the BS when the MS is located within the coverage of the BS. As such, a maximum transfer rate, a throughput of an intra-cell user, and a throughput of an entire cell are decreased between the BS and the MS due to several factors such as scatters, a movement speed of the MS, a distance between transmission and reception, or the like. For example, when the MS is located in a cell boundary or when an obstacle such as a building exists between the MS and the BS, communication quality between the MS and the BS may not be satisfactory.

As an effort to overcome the aforementioned problem, the wireless communication system may employ a relay station (RS). The RS is a device for relaying a signal between the MS and the BS. The RS employs several techniques to compensate for deterioration of signals transmitted between the BS and the MS, and thus the wireless communication system is expected to obtain throughput improvement, coverage expansion, or the like.

When the wireless communication system employs the RS, there is a problem in a method of transmitting a scheduling request between the RS and the BS. In particular, the problem arises when a hybrid automatic repeat request (HARQ) is applied between the RS and the BS. The HARQ is a scheme in which channel coding of a physical layer is combined with the conventional ARQ scheme to improve transmission efficiency in data processing. When using the HARQ, a data transmission error is handled in the physical layer. Therefore, error correction can be achieved faster than the case of using the ARQ performed in a higher layer.

The HARQ can be classified into a synchronous HARQ and an asynchronous HARQ. The synchronous HARQ is a scheme in which data is retransmitted at a time known to both the BS and the MS. The synchronous HARQ can reduce signaling required for transmission of data such as an HARQ process number. The asynchronous HARQ is a scheme in which a resource is allocated at any time for retransmission. The asynchronous HARQ requires exchange of resource allocation information needed for transmission of a scheduling request signal and data. $3^{rd}$ generation partnership project long term evolution (3GPP LTE) uses the synchronous HARQ in uplink transmission and uses the asynchronous HARQ in downlink transmission.

In the wireless communication system employing the RS, a radio resource used between the BS and the RS is limited and opportunity of using the radio resource is variable. This is because the radio resource is allocated even to a link between the RS and an MS connected to the RS. This is also because signal transmission and reception cannot be simultaneously performed in the link between the BS and the RS and the link between the RS and the MS connected to the RS.

It is problematic when the synchronous HARQ applied to the link between the BS and the MS is directly applied to the link between the BS and the RS. In addition, it is ineffective to directly apply the conventional asynchronous HARQ in which the scheduling request and the resource allocation information are repetitively exchanged.

DISCLOSURE OF INVENTION

Technical Problem

The present invention provides a method and apparatus for transmitting a scheduling request in a wireless communication system.

Solution to Problem

According to an aspect of the present invention, a method of transmitting a scheduling request in a wireless communication system is provided. The method includes: transmitting a scheduling request signal by a relay station to a base station in a first subframe; and transmitting data by the relay station to the base station in a second subframe, wherein the scheduling request signal includes allocation information on the second subframe in which the data is transmitted.

In the aforementioned aspect of the present invention, each of the first subframe and the second subframe may be any one of subframes in which the relay station does not receive a signal from a relay mobile station connected to the relay station, and the first subframe and the second subframe may be subframes pre-agreed with the base station.

In addition, the scheduling request signal may be transmitted using a radio resource pre-agreed with the base station in the first subframe, and the scheduling request signal may include information on an allocation rule indicating in which position the second subframe is located in each radio frame.

In addition, the pre-agreed radio resource is announced by the base station to the relay station by using a higher-layer signal or a physical-layer signal.

In addition, the scheduling request signal may include time duration information, and the time duration information may indicate a radio frame duration in which the information on the allocation rule is valid.

In addition, the time duration information indicates a specific number of radio frames, where the specific number is predetermined between the relay station and the base station.

In addition, the number of first subframes or the number of second subframes included in one radio frame may vary depending on a traffic amount of an access link between the relay station and the relay mobile station connected to the relay station and a traffic amount of a backhaul link between the base station and the relay station.

According to another aspect of the present invention, there is provided a relay station including: a radio frequency (RF) unit for transmitting and receiving radio signals; and a processor coupled to the RF unit, wherein the processor controls the RF unit to transmit a scheduling request signal to a base station in a first subframe and to transmit data to the base station in a second subframe, and the scheduling request signal includes allocation information on the second subframe in which the data is transmitted.

Advantageous Effects of Invention

Data can be effective transmitted between a relay station and a base station in a wireless communication system.

BRIEF DESCRIPTION OF DRAWINGS

FIG. 6 shows an example of a subframe available in a backhaul link when 4 hybrid automatic repeat request (HARQ) processes are performed in an access link.

FIG. 7 to FIG. 12 show examples of subframes available in a backhaul link according to the number of HARQ processes performed in an access link.

MODE FOR THE INVENTION

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiplex access (SC-FDMA) in an uplink. LTE-advance (LTE-A) is an evolution of the LTE. For clarity, the following description will focus on the 3GPP LTE/LTE-A. However, technical features of the present invention are not limited thereto.

Figure 1:
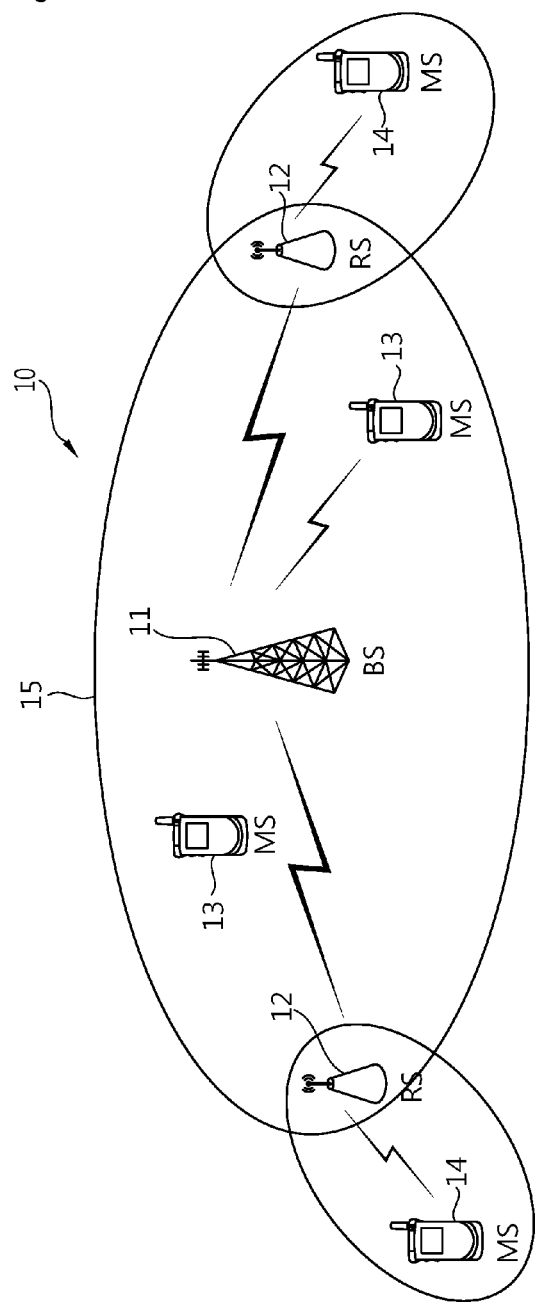
FIG. 1 is a wireless communication system employing a relay station (RS).

FIG. 1 is a wireless communication system employing a relay station (RS).

Referring to FIG. 1, a wireless communication system 10 employing an RS 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a mobile station (MS) 13 and may be referred to as another terminology, such as an evolved node-B (eNB), a base transceiver system (BTS), an access point, an access network (AN), etc. The BS 11 can perform functions such as connectivity between the RS 12 and an MS 14, management, control, resource allocation, etc.

The RS 12 is a device for relaying a signal between the BS 11 and the MS 14, and is also referred to as another terminology such as a relay node (RN), a repeater, etc. A relay scheme used in the RS may be either amplify and forward (AF) or decode and forward (DF), and the technical features of the present invention are not limited thereto.

The MSs 13 and 14 may be fixed or mobile, and may be referred to as another terminology, such as a user equipment (UE), a user terminal (UT), a subscriber station (SS), a wireless device, a personal digital assistant (PDA), a wireless modem, a handheld device, an access terminal (AT), etc. Hereinafter, a macro MS 13 denotes an MS that directly communicates with the BS 11, and a relay MS 14 denotes an MS that communicates with the RS.

A link between the BS and the RS is referred to as a backhaul link. A link between the RS and the relay MS is referred to as an access link. Communication from the BS to the RS is referred to as a backhaul downlink. Communication from the RS to the BS is referred to as a backhaul uplink. Communication from the RS to the relay MS is referred to as an access downlink. Communication from the relay MS to the RS is referred to as an access uplink.

The backhaul downlink and the backhaul uplink may operate in a frequency division duplex (FDD) mode or a time division duplex (TDD) mode. The access downlink and the access uplink may also operate in the FDD mode or the TDD mode.

Figure 2:
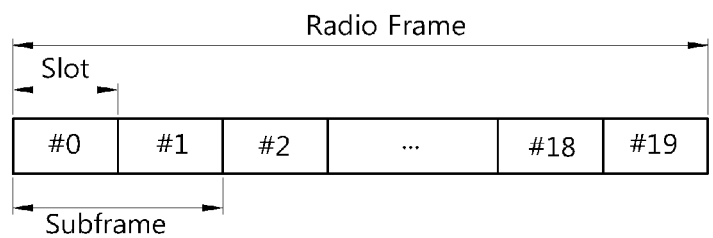
FIG. 2 shows a structure of a frequency division duplex (FDD) radio frame of a $3^{rd}$ generation partnership project long term evolution (3GPP LTE) system.

FIG. 2 shows a structure of an FDD radio frame of a 3GPP LTE system. The section 4.1 of 3GPP TS 36.211 "Technical Specification; Evolved Universal Terrestrial Radio Access (E-UTRA); Physical Channels and Modulation (Release 8)" may be incorporated herein by reference. When in the FDD mode, downlink transmission and uplink transmission are divided in a frequency domain and thus are identified in a frequency division manner.

Referring to FIG. 2, the radio frame consists of 10 subframes, and one subframe consists of two slots. For example, one subframe may have a length of 1 millisecond (ms), and one slot may have a length of 0.5 ms. The slot may consist of 7 symbols in case of a normal cyclic prefix (CP), and may consist of 6 symbols in case of an extended CP.

Figure 3:
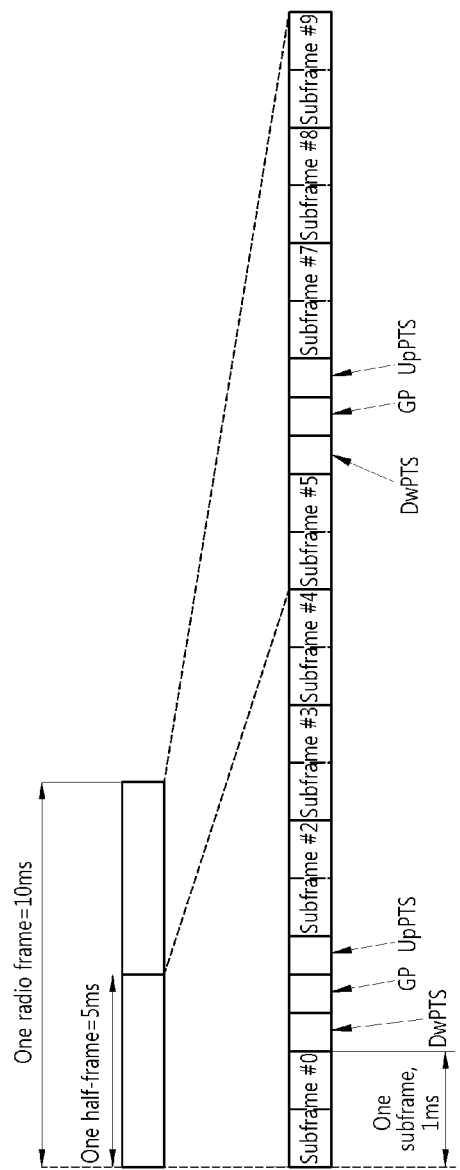
FIG. 3 shows a structure of a time division duplex (TDD) radio frame of a 3GPP LTE system.

FIG. 3 shows a structure of a TDD radio frame of a 3GPP LTE system. The section 4.2 of 3GPP TS 36.211 "Technical Specification; Evolved Universal Terrestrial Radio Access (E-UTRA); Physical Channels and Modulation (Release 8) may be incorporated herein by reference.

Referring to FIG. 3, a radio frame consists of two half-frames. The half-frame consists of five subframes.

An uplink and a downlink are identified in a subframe unit. An uplink subframe and a downlink subframe are separated by a switching point. The switching point is a region for separating the uplink and the downlink between the uplink subframe and the downlink subframe. The radio frame has at least one switching point. The switching point includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and for uplink transmission synchronization of an MS. The GP is a guarding duration for removing interference generated in the uplink due to a multi-path delay of a downlink signal between the uplink and the downlink.

The radio frame structures of FIG. 2 and FIG. 3 are for exemplary purposes only, and thus the number of subframes included in the radio frame or the number of slots included in the subframe may change variously.

Figure 4:
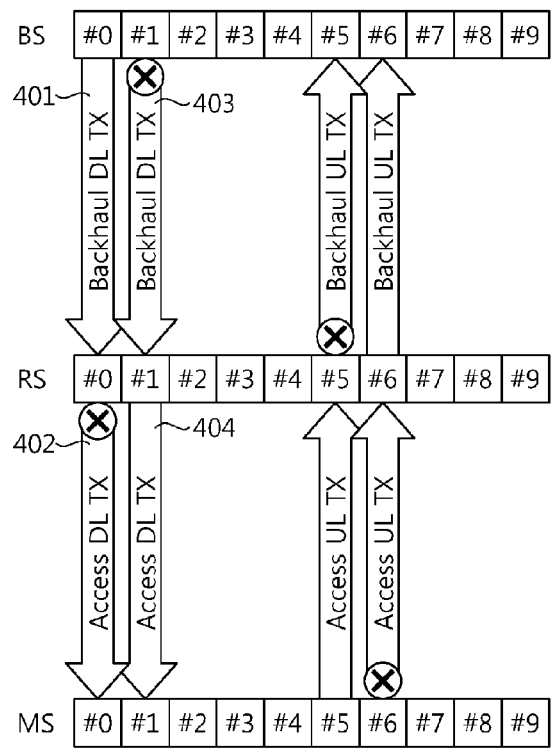
FIG. 4 shows an example of an operation of a time division multiplexing (TDM) RS.

FIG. 4 shows an example of an operation of a time division multiplexing (TDM) RS. It is assumed hereinafter that a backhaul downlink and an access downlink transmit signals by using the same frequency band 1, and a backhaul uplink and an access uplink transmit signals by using the same frequency band f2. Herein, f1 and f2 are frequency bands different from each other.

Referring to FIG. 4, in a subframe #0, if an RS receives a signal from a BS through a backhaul downlink 401, the RS cannot transmit a signal to a relay MS through an access downlink 402. In a subframe #1, if the RS transmits a signal to the relay MS through an access downlink 404, the RS cannot receive a signal from the BS through a backhaul downlink 403. Likewise, in a subframe #5, if the RS receives a signal from the relay MS through an access uplink, and the RS cannot transmit a signal to the BS through a backhaul uplink. In a subframe #6, if the RS transmits a signal to the BS through a backhaul uplink, the RS cannot receive a signal from the relay MS through an access uplink. As such, the RS cannot simultaneously transmit and receive signals by using the same frequency band. An operation mode of the RS will be described by considering such a limitation.

Figure 5:
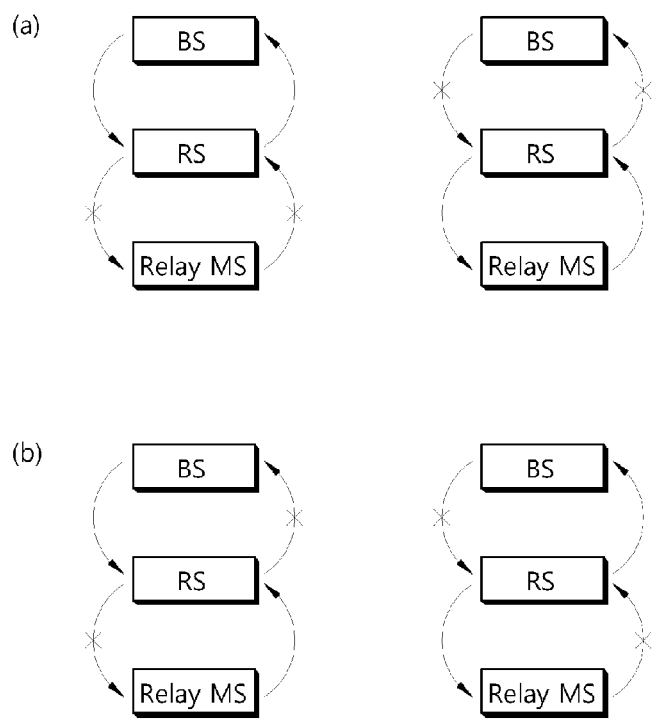
FIG. 5 shows an operation mode of an RS.

FIG. 5 shows an operation mode of an RS.

Referring to FIG. 5A, when a backhaul downlink and a backhaul uplink between a BS and an RS are activated, an access downlink and an access uplink between the RS and a relay MS are inactivated, and when the access downlink and the access uplink between the RS and the relay MS are activated, the backhaul downlink and the backhaul uplink between the BS and the RS are inactivated. This will be hereinafter referred to as a mode 1. That is, the mode 1 denotes a case where the RS simultaneously transmits and receives signals through any one of the backhaul link and the access link.

Referring to FIG. 5B, when a backhaul downlink between a BS and an RS and an access uplink between the RS and an relay MS are activated, an access downlink between the RS and the relay MS and a backhaul uplink between the BS and the RS are inactivated, and when the backhaul uplink between the BS and the RS and the access downlink between the RS and the relay MS are activated, the access uplink between the RS and the relay MS and the backhaul downlink between the BS and the RS are inactivated. This will be hereafter referred to as a mode 2. That is, the mode 2 denotes a case where the RS either transmits or receives signals through each of the backhaul link and the access link.

A radio resource (e.g., a subframe) available in the backhaul link when the RS operates in the aforementioned mode (i.e., the mode 1 or the mode 2) will be described.

FIG. 6 shows an example of a subframe available in a backhaul link when 4 HARQ processes are performed in an access link.

Referring to FIG. 6, a "Relay DL Rx" column 601 indicates whether an access downlink from an RS to a relay MS is used, and a "Relay UL Rx" column 602 indicates whether an access uplink from the relay MS to the RS is used. In the "Relay DL Rx" column 601 and the "Relay UL Rx" column 602, "1" indicates use, and "0" indicates non-use.

"HP1" to "HP4" columns indicate subframes in which an HARQ process can be performed. In FIG. 6, four HARQ processes are performed in each of an access uplink and an access downlink. For example, in case of the "HP1" column, data is initially transmitted from the RS to the relay MS through the access downlink in a subframe #0, an acknowledgement/negative acknowledgement (ACK/NACK) signal is transmitted from the relay MS to the RS through the access uplink in a subframe #4, and data is retransmitted or initially transmitted from the RS to the relay MS through the access downlink in a subframe #8 which is 8 subframes later from the initial transmission.

In an "SCH(n)" column and an "(n+4)" column, subframes indicated by a dashed line pattern and having a value of "1" are subframes including primary control information, which must be transmitted through the access downlink, and access uplink subframes related thereto. That is, the primary control information which must be transmitted through the access downlink is transmitted in a subframe #n, and an ACK/NACK signal related thereto is transmitted through the access uplink in a subframe #(n+4).

In a backhaul downlink column or a backhaul uplink column, "0" indicates a subframe available in a backhaul link. For example, the RS can operate in the mode 1 in subframes #1, #7, #11, #17, #21, #27, #31, and #37. In addition to the subframes in which the RS can operate in the mode 1, the RS can operate in the mode 2 in subframes #3, #5, #13, #15, #23, #25, #33, and #35. As described with reference to FIG. 6, an available subframe is inconsistently generated in the backhaul link between the RS and the BS, and the available subframe is limited.

Table 1 shows a result of analyzing usage efficiency of the backhaul link and the access link according to the example of FIG. 6.

TABLE 1

| | | |
|---|---|---|
| RS to Relay MS | 2nd Downlink Occupancy (No.) | 28 |
| | 2nd Downlink Occupancy (%) | 70 |
| | 1st Downlink availability (%) | 30 |
| Relay MS to RS | 2nd Uplink Occupancy (No.) | 28 |
| | 2nd Uplink Occupancy (%) | 70 |
| | 1st Uplink availability (%) | 30 |
| RS-BS (Mode 1 only) | 2nd Downlink and/or 2nd Uplink Occupancy (No.) | 32 |
| | Access link Occupancy (%) | 80 |
| | Backhaul link availability (%) | 20 |
| RS-BS (Mode 1 or Mode 2) | 2nd Downlink and 2nd Uplink Occupancy (No.) | 24 |
| | 2nd Downlink or 2nd Uplink Occupancy (No.) | 8 |
| | Access link Occupancy (%) | 70 |
| | Backhaul link availability (%) | 30 |

In Table 1, when the RS operates only in the mode 1 (indicated by RS-BS (Mode 1 only)), the backhaul link availability is 20%. This is because the RS can operate in the mode 1 only in 8 subframes out of a total of 40 subframes. When the RS operates while switching to the mode 1 or the mode 2 (indicated by RS-BS (Mode 1 or Mode 2)), the backhaul link availability is 30%. According to a traffic amount in the backhaul link and the access link, the RS may selectively operate only in the mode 1 or operate by switching to the mode 1 and the mode 2.

FIG. 7 to FIG. 12 show examples of subframes available in a backhaul link according to the number of HARQ processes performed in an access link. If the number of HARQ processes performed in the access downlink and the number of HARQ processes performed in the access uplink are expressed by (x, y) for convenience in FIG. 7 to FIG. 12, (x, y) is (3, 4) in FIG. 7, (2, 4) in FIG. 8, and (1, 4) in FIG. 9. Further, (x, y) is (4, 3) in FIG. 10, (4, 2) in FIG. 11, and (4, 1) in FIG. 12.

Table 2, 3, 4, 5, 6, and 7 show results obtained by analyzing usage efficiency of the backhaul link and the access link according to FIG. 7, FIG. 8, FIG. 9, FIG. 10, FIG. 11, and FIG. 12, respectively.

TABLE 2

| | | |
|---|---|---|
| RS to Relay MS | 2nd Downlink Occupancy (No.) | 25 |
| | 2nd Downlink Occupancy (%) | 62.5 |
| | 1st Downlink availability (%) | 37.5 |
| Relay MS to RS | 2nd Uplink Occupancy (No.) | 28 |
| | 2nd Uplink Occupancy (%) | 70 |
| | 1st Uplink availability (%) | 30 |
| RS-BS (Mode 1 only) | 2nd Downlink and/or 2nd Uplink Occupancy (No.) | 32 |
| | Access link Occupancy (%) | 80 |
| | Backhaul link availability (%) | 20 |
| RS-BS (Mode 1 or Mode 2) | 2nd Downlink and 2nd Uplink Occupancy (No.) | 21 |
| | 2nd Downlink or 2nd Uplink Occupancy (No.) | 11 |
| | Access link Occupancy (%) | 66.25 |
| | Backhaul link availability (%) | 33.75 |

TABLE 3

| | | |
|---|---|---|
| RS to Relay MS | 2nd Downlink Occupancy (No.) | 22 |
| | 2nd Downlink Occupancy (%) | 55 |
| | 1st Downlink availability (%) | 45 |
| Relay MS to RS | 2nd Uplink Occupancy (No.) | 28 |
| | 2nd Uplink Occupancy (%) | 70 |
| | 1st Uplink availability (%) | 30 |
| RS-BS (Mode 1 only) | 2nd Downlink and/or 2nd Uplink Occupancy (No.) | 32 |
| | Access link Occupancy (%) | 80 |
| | Backhaul link availability (%) | 20 |
| RS-BS (Mode 1 or Mode 2) | 2nd Downlink and 2nd Uplink Occupancy (No.) | 18 |
| | 2nd Downlink or 2nd Uplink Occupancy (No.) | 14 |
| | Access link Occupancy (%) | 62.5 |
| | Backhaul link availability (%) | 37.5 |

TABLE 4

| | | |
|---|---|---|
| RS to Relay MS | 2nd Downlink Occupancy (No.) | 19 |
| | 2nd Downlink Occupancy (%) | 47.5 |
| | 1st Downlink availability (%) | 52.5 |
| Relay MS to RS | 2nd Uplink Occupancy (No.) | 28 |
| | 2nd Uplink Occupancy (%) | 70 |
| | 1st Uplink availability (%) | 30 |
| RS-BS (Mode 1 only) | 2nd Downlink and/or 2nd Uplink Occupancy (No.) | 32 |
| | Access link Occupancy (%) | 80 |
| | Backhaul link availability (%) | 20 |
| RS-BS (Mode 1 or Mode 2) | 2nd Downlink and 2nd Uplink Occupancy (No.) | 15 |
| | 2nd Downlink or 2nd Uplink Occupancy (No.) | 17 |
| | Access link Occupancy (%) | 58.75 |
| | Backhaul link availability (%) | 41.25 |

TABLE 5

| | | |
|---|---|---|
| RS to Relay MS | 2nd Downlink Occupancy (No.) | 28 |
| | 2nd Downlink Occupancy (%) | 70 |
| | 1st Downlink availability (%) | 30 |

TABLE 5-continued

| | | |
|---|---|---|
| Relay MS to RS | 2nd Uplink Occupancy (No.) | 25 |
| | 2nd Uplink Occupancy (%) | 62.5 |
| | 1st Uplink availability (%) | 37.5 |
| RS-BS (Mode 1 only) | 2nd Downlink and/or 2nd Uplink Occupancy (No.) | 32 |
| | Access link Occupancy (%) | 80 |
| | Backhaul link availability (%) | 20 |
| RS-BS (Mode 1 or Mode 2) | 2nd Downlink and 2nd Uplink Occupancy (No.) | 21 |
| | 2nd Downlink or 2nd Uplink Occupancy (No.) | 11 |
| | Access link Occupancy (%) | 66.25 |
| | Backhaul link availability (%) | 33.75 |

TABLE 6

| | | |
|---|---|---|
| RS to Relay MS | 2nd Downlink Occupancy (No.) | 28 |
| | 2nd Downlink Occupancy (%) | 70 |
| | 1st Downlink availability (%) | 30 |
| Relay MS to RS | 2nd Uplink Occupancy (No.) | 22 |
| | 2nd Uplink Occupancy (%) | 55 |
| | 1st Uplink availability (%) | 45 |
| RS-BS (Mode 1 only) | 2nd Downlink and/or 2nd Uplink Occupancy (No.) | 32 |
| | Access link Occupancy (%) | 80 |
| | Backhaul link availability (%) | 20 |
| RS-BS (Mode 1 or Mode 2) | 2nd Downlink and 2nd Uplink Occupancy (No.) | 18 |
| | 2nd Downlink or 2nd Uplink Occupancy (No.) | 14 |
| | Access link Occupancy (%) | 62.5 |
| | Backhaul link availability (%) | 37.5 |

TABLE 7

| | | |
|---|---|---|
| RS to Relay MS | 2nd Downlink Occupancy (No.) | 28 |
| | 2nd Downlink Occupancy (%) | 70 |
| | 1st Downlink availability (%) | 30 |
| Relay MS to RS | 2nd Uplink Occupancy (No.) | 19 |
| | 2nd Uplink Occupancy (%) | 47.5 |
| | 1st Uplink availability (%) | 52.5 |
| RS-BS (Mode 1 only) | 2nd Downlink and/or 2nd Uplink Occupancy (No.) | 32 |
| | Access link Occupancy (%) | 80 |
| | Backhaul link availability (%) | 20 |
| RS-BS (Mode 1 or Mode 2) | 2nd Downlink and 2nd Uplink Occupancy (No.) | 15 |
| | 2nd Downlink or 2nd Uplink Occupancy (No.) | 17 |
| | Access link Occupancy (%) | 58.75 |
| | Backhaul link availability (%) | 41.25 |

In Table 1 to Table 7 above, it can be seen that the backhaul link availability changes according to the number of HARQ processes performed by the access links (i.e., the access uplink and the access downlink). The RS can correct unbalance between the backhaul link and the access link by controlling the number of HARQ processes performed in the access uplink and the access downlink according to a traffic amount of the backhaul link and the access link. For example, if the traffic amount increases in the backhaul link, the backhaul link availability can be increased by decreasing the number of HARQ processes of the access link.

In addition, referring to FIG. 7 to FIG. 12, it can be seen that the number of subframes available in the backhaul link is limited and is not generated consistently. Therefore, direct use of the conventional synchronous HARQ is not desired when backhaul uplink transmission is performed through the backhaul link, and the backhaul uplink and the backhaul downlink can both operate the asynchronous HARQ. Alternatively, while operating the asynchronous HARQ as a whole, the synchronous HARQ can be operated only for a specific time duration. For example, the specific time duration may be a time duration including a plurality of radio frames.

Figure 13:
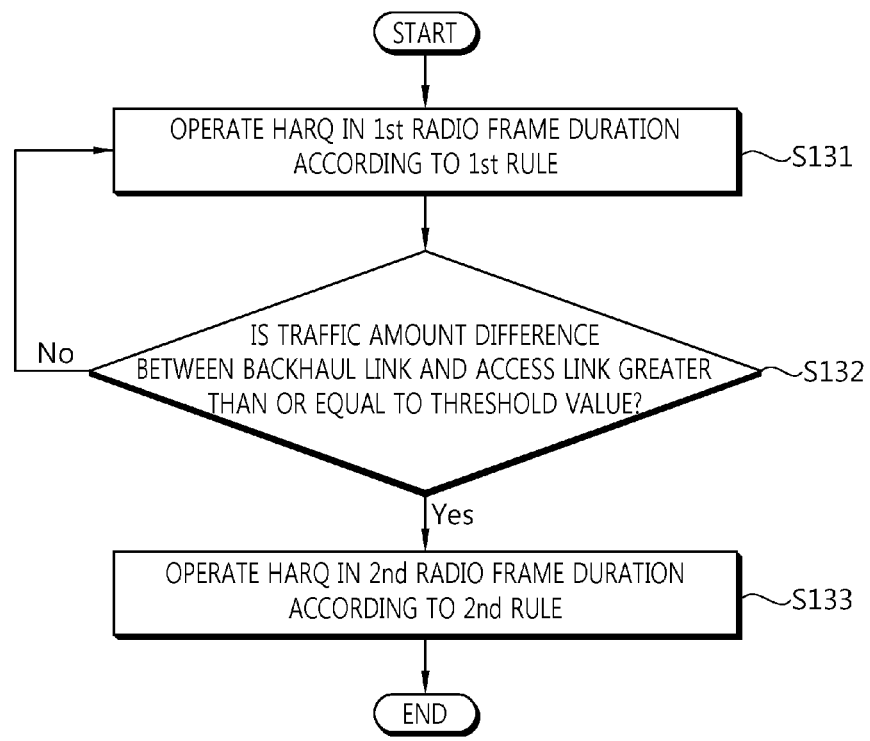
FIG. 13 is a flowchart showing a procedure of operating a synchronization HARQ process in a unit of a specific time duration.

FIG. 13 is a flowchart showing a procedure of operating a synchronization HARQ process in a unit of a specific time duration.

Referring to FIG. 13, a BS and an RS operate an HARQ in a $1^{st}$ radio frame duration according to a $1^{st}$ rule (step S131).

The 1$^{st}$ radio frame duration may be a time duration including a plurality of radio frames. For example, the 1$^{st}$ radio frame duration may be a time duration including 4 radio frames, e.g., a radio frame #n to a radio frame #(n+3). The 1$^{st}$ rule may indicate a subframe available in a backhaul link in each radio frame. For example, the 1$^{st}$ rule may indicate whether data can be transmitted/received between the BS and the RS in a subframe #1 and a subframe #7 of each radio frame. In this case, the BS and the RS may operate synchronous HARQ processes by assigning an HARQ process 1 to the subframe #1 and by assigning an HARQ process 2 to the subframe #7 of each radio frame belonging to the 1$^{st}$ radio frame duration. In this case, the RS may operate in the mode 1 or the mode 2.

The BS or the RS determines whether there is a need to change the 1$^{st}$ radio frame duration and/or the 1$^{st}$ rule according to a result of whether a traffic amount difference between a backhaul link and an access link is greater than or equal to a threshold value (step S132). Although the necessity of changing the 1$^{st}$ radio frame duration and/or the 1$^{st}$ rule is determined herein according to whether the traffic amount difference between the backhaul link and the access link is greater than or equal to the threshold value, this is for exemplary purposes only. Thus, the necessity can also be determined by using another algorithm.

If it is determined that the 1$^{st}$ radio frame duration and/or the 1$^{st}$ rule need to be changed, the BS and the RS operate the HARQ in a 2$^{nd}$ radio frame duration according to a 2$^{nd}$ rule (step S133). The 2$^{nd}$ radio frame duration may be a time duration including five radio frames such as a radio frame #(n+4) to a radio frame #(n+8). The 2$^{nd}$ rule may indicate a subframe available in a backhaul link in each radio frame different from that used in the 1$^{st}$ rule. For example, the 2$^{nd}$ rule may indicate that data can be transmitted/received between the BS and the RS in a subframe #3 and a subframe #5 of each radio frame. In this case, the RS may operate in the mode 2.

If it is assumed that the subframe available in the backhaul link doesn't change rapidly in specific time duration, an operation is performed by assigning a specific subframe to an HARQ process in the specific time duration. It can be seen that such a method is similar to a synchronous HARQ operation in a specific time duration.

A new scheduling request transmission method to be described below can be used to operate an asynchronous HARQ between the BS and the RS. Although the scheduling request transmission method is described by focusing on a backhaul uplink, the present invention can also apply to a backhaul downlink.

Figure 14:
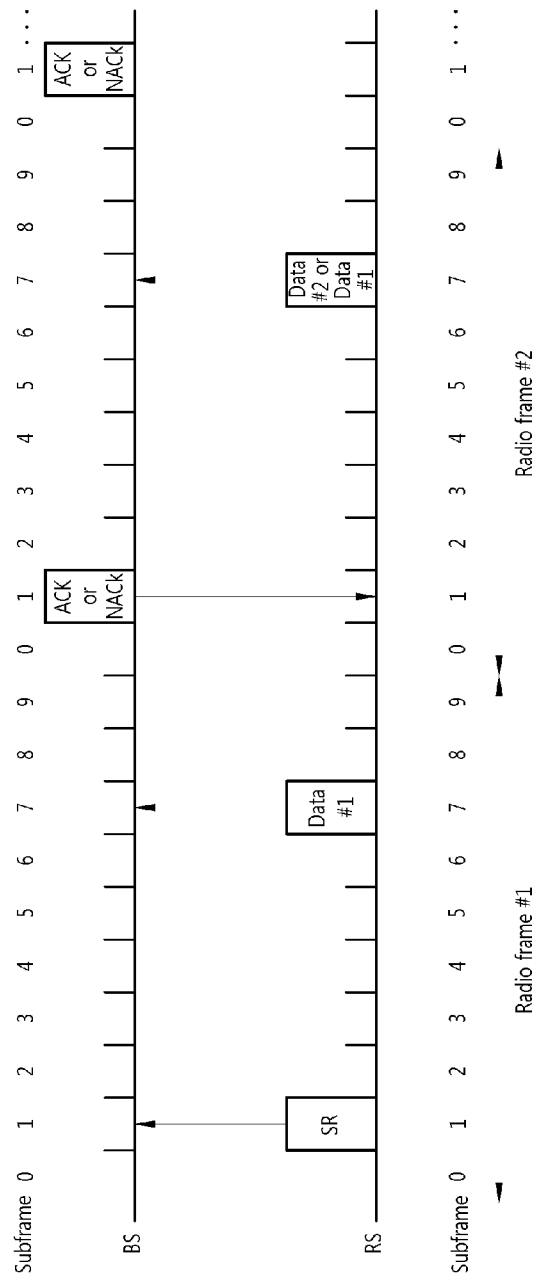
FIG. 14 shows a method of transmitting a scheduling request of an RS according to an embodiment of the present invention.

FIG. 14 shows a method of transmitting a scheduling request of an RS according to an embodiment of the present invention. Referring to FIG. 14, the RS transmits a scheduling request signal (SR) to a BS in a subframe #1. The scheduling request signal may include time duration information and information on an allocation rule used in a radio frame duration. Herein, the time duration information may be information indicating a radio frame duration in which an allocation rule is valid for a subframe used when the RS transmits data to the BS. For example, the time duration information may information indicating a radio frame duration including radio frames #1 to #4. Further, the information on an allocation rule may indicate in which position a subframe used when the RS transmits data to the BS is located in each radio frame. For example, it may indicate that subframes #1 and #7 of each radio frame are subframes available between the BS and the RS. Then, upon receiving the scheduling request signal from the RS, the BS can know in which radio frame duration and in which subframe a signal has to be transmitted.

After transmitting the scheduling request signal, the RS transmits data #1 in a subframe #7 of a radio frame #1. The BS transmits acknowledgement/negative acknowledgement (ACK/NACK) for the data #1 to the RS in a subframe #1 of a radio frame #2. The RS transmits data #2 or retransmits the data #1 according to the ACK or NACK transmitted by the BS in a subframe #7 of the radio frame #2. The BS and the RS may perform such a process in the radio frames #1 to #4.

Figure 15:
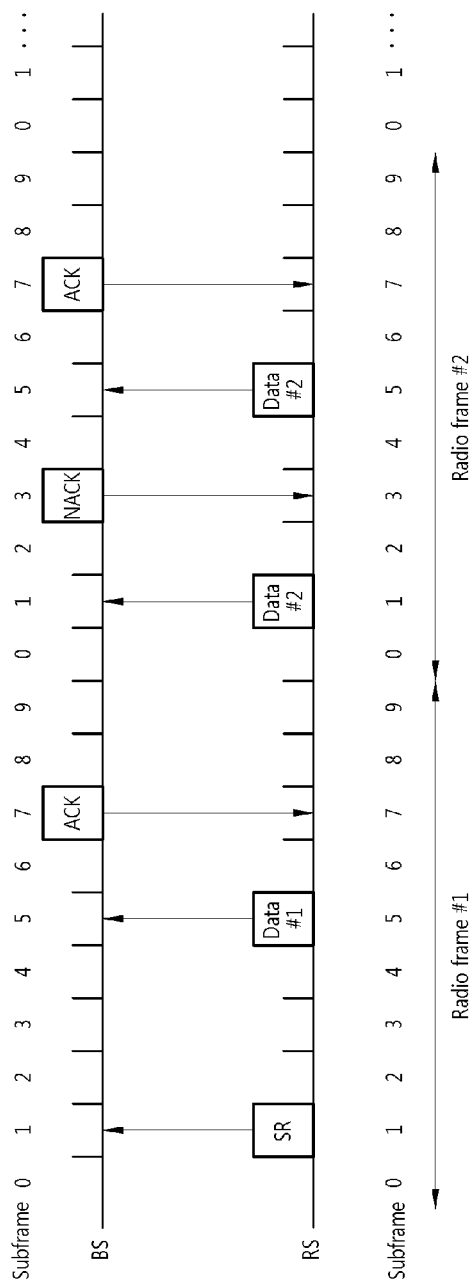
FIG. 15 shows a method of transmitting a scheduling request of an RS according to another embodiment of the present invention.

FIG. 15 shows a method of transmitting a scheduling request of an RS according to another embodiment of the present invention. Referring to FIG. 15, the RS transmits a scheduling request signal (SR) to a BS in a subframe #1. In this case, time duration information included in the scheduling request signal may indicate radio frames #1 to #8, and the aforementioned information on a rule may indicate that subframes #1, #3, #5, and #7 of each radio frame are subframes available between the BS and the RS. In this case, the subframe #5 of each radio frame may be available only for backhaul uplink transmission, and the subframe #3 of each radio frame may be available only for backhaul downlink transmission. Further, the subframes #1 and #7 of each radio frame may be available for backhaul uplink transmission or backhaul downlink transmission. The RS may operate in the mode 1 or the mode 2 in the subframe #1 and #7 of each radio frame, and may operate only in the mode 2 in the subframe #3 and #5. Upon receiving the scheduling request signal from the RS, the BS can know in which radio frame duration and in which subframe a signal has to be transmitted.

Figure 16:
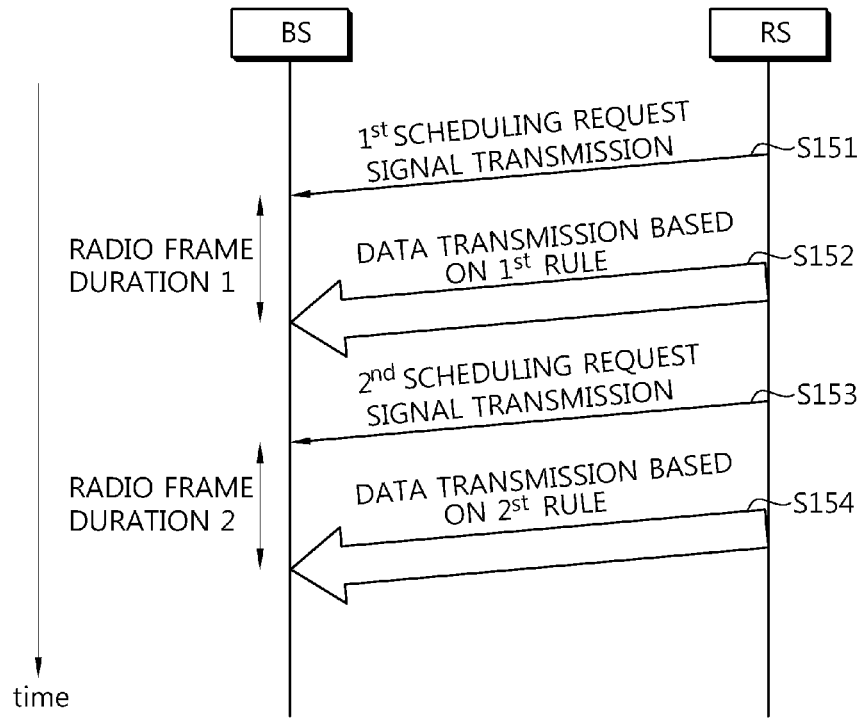
FIG. 16 shows a process for transmitting a scheduling request signal including time duration information and for transmitting data by an RS.

FIG. 16 shows a process for transmitting a scheduling request signal including time duration information and for transmitting data by an RS. Referring to FIG. 16, the RS transmits a 1$^{st}$ scheduling request signal in a 1$^{st}$ subframe (step S151). For example, the 1$^{st}$ scheduling request signal may include time duration information and information on a rule used in a radio frame duration as described with reference to FIG. 14. If the time duration and the rule described with reference to FIG. 14 are respectively referred to as a radio frame duration 1 and a 1$^{st}$ rule, the RS transmits data to a BS in the radio frame duration 1 according to the 1$^{st}$ rule (step S152).

The RS transmits a 2$^{nd}$ scheduling request signal in a 2$^{nd}$ subframe (step S153). The 2$^{nd}$ scheduling request signal may include time duration information and information on a rule used in a radio frame duration as described with reference to FIG. 15. If the time duration and the rule described with reference to FIG. 15 are respectively referred to as a radio frame duration 2 and a 2$^{nd}$ rule, the BS transmits data to the BS in the radio frame duration 2 according to the 2$^{nd}$ rule (step S154). The 1$^{st}$ rule and the 2$^{nd}$ rule may be equal to or different from each other. Whether to change the rule between the radio frame durations 1 and 2 may be determined according to the traffic amount of the backhaul link and the access link as described above. The radio frame duration 1 or 2 may include a specific number of radio frames, where the specific number is predetermined between the BS and the RS. Alternatively, the radio frame duration 1 or 2 may include any number of radio frames.

In the backhaul link, an available subframe may be limited, and a time interval in which a next subframe is allocated to the backhaul link after a specific subframe is allocated to the backhaul link may not be negligible. Therefore, as described with reference to FIG. 14 and FIG. 15, it is desired to transmit the scheduling request signal only once so that data transmission can be performed without further scheduling request signal transmission in a specific radio frame duration. Unlike in the conventional method in which the BS transmits uplink resource allocation information to a macro MS when the BS receives the scheduling request signal and the macro MS transmits data to the BS according to the uplink resource allocation information, the present invention can transmit data without having to receive the uplink resource allocation information after the RS transmits the scheduling request signal.

When the RS transmits a scheduling request signal, the scheduling request signal announces a specific radio frame duration and an allocation rule of a subframe available for backhaul link transmission in the specific radio frame duration. Therefore, the BS can know the specific radio frame duration and a subframe applied to a backhaul link in the specific radio frame duration after receiving the scheduling request signal itself or receiving the scheduling request signal itself and pre-determined rule information. As a result, the RS can transmit data according to the allocation rule in the specific radio frame duration without having to receive a response from the BS after transmitting the scheduling request signal. According to the present invention, a radio resource of all subframes available in the backhaul link (hereinafter referred to as available subframes) can be reserved to transmit the scheduling request signal in any one of the available subframe, or the radio resource may be reserved only in a specific subframe among the available subframes to transmit the scheduling request signal. This may differ depending on a configuration of an available subframe in the backhaul link.

In a case where the radio resource is reserved only in the specific subframe to transmit the scheduling request signal, an overhead required when the BS monitors the scheduling request signal can be reduced. In addition, the RS may separately specify a subframe for transmitting the scheduling request signal and a subframe for transmitting data so as to operate a dedicated subframe for transmitting only the scheduling request signal.

A specific subframe previously reserved between the BS and the RS in transmission of the scheduling request signal or a previously reserved radio resource can be implemented by using higher-layer signaling, physical-layer signaling, or an implicit method. For example, the higher-layer signaling may be performed by exchanging a radio resource control (RRC) message through an RRC layer among layers of a radio interface protocol between the BS and the RS. The RRC message may be configured for example in a bitmap format. The BS operates a radio resource of a backhaul link by semi-statically assigning the radio resource (i.e., the set of downlink backhaul subframes, during which downlink backhaul transmission may occur, is semi-statically assigned. The set of uplink backhaul subframes, during which uplink backhaul transmission may occur, can be semi-statically assigned, or implicitly derived from the downlink backhaul subframes using the HARQ timing relationship). The RS can transmit the scheduling request signal by using the allocated resource or a part of the allocated resource.

An example of configuring a scheduling request signal transmitted by the RS to the BS will be described. The scheduling request signal may be configured with N bits (where N is an integer greater than or equal to 2). Accordingly, a variety of information (i.e., a radio frame duration, information on a rule used in the radio frame duration, time duration information, a data transmission amount, a data transmission time, a modulation scheme, a transmission parameter, etc.) may be partially or entirely included in addition to information simply indicating a presence or absence of a scheduling request.

For example, the conventional semi-persistent scheduling (SPS) may be used with modification to transmit the scheduling request signal including the aforementioned time duration information and to transmit backhaul link data by using a specific subframe of each radio frame in a specific radio frame duration. Since the conventional SPS is designed dedicated to a voice service such as VoIP, it is applied to a service which is susceptible to errors. However, error occurrence needs to be prevented since a large amount of important data may be transmitted in the backhaul link. In SPS defined at present in the 3GPP LTE, a specific radio frame duration is announced using a 'semiPersistSchedIntervalDL' signal. A signal indicating a specific subframe can be used in the present invention instead of the 'semiPersistSchedIntervalDL'. Preferably, the signal is implemented with a higher-layer (e.g., an RRC layer) signal rather than a physical-layer signal. This is because a probability of error occurrence is high when implemented in the physical layer. Of course, according to a service type, the signal can be implemented with the physical-layer signal as long as the physical-layer signal is sufficient. In the present invention, the signal for announcing the radio frame duration can be implemented in a bitmap format.

If the time duration information is not included in the scheduling request signal, the RS which has been transmitting data to the BS in the same pattern may transmit a specific signal to the BS to announce that such a pattern is no longer used. For example, the RS which has been operating in a pattern for transmitting data to the BS in a subframe #1 of each radio frame may transmit a specific signal to the BS to announce that the subframe #1 is no longer used.

In the above description, the radio frame duration indicates a time duration by radio frame unit. But, this is for exemplary purposes only, and thus the radio frame duration may indicate a time duration by subframe unit. For example, the radio frame duration may indicate a time duration from subframe #3 of radio frame #n to subframe #6 of radio frame #(n+4). Or the radio frame duration may indicate a time duration by plurality of radio frame unit. For example, the plurality of radio frame unit may be 4 radio frames unit.

Figure 17:
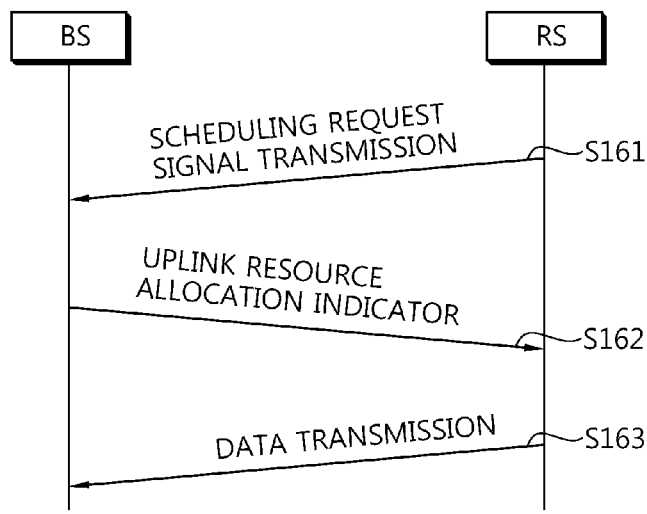
FIG. 17 shows a method of transmitting a scheduling request of an RS according to another embodiment of the present invention.

FIG. 17 shows a method of transmitting a scheduling request of an RS according to another embodiment of the present invention. Referring to FIG. 17, when the RS transmits a scheduling request signal (step S161), a BS transmits an uplink resource allocation indicator (step S162). In this case, the uplink resource allocation indicator transmitted by the BS may be information indicating any one of pre-defined radio resources. For example, the uplink radio allocation indicator may indicate a radio resource for transmitting only a buffer status report (BSR) by the RS or a radio resource capable of transmitting data in a specific amount pre-agreed with the RS. Since the uplink radio allocation indicator has a less information amount than the conventional uplink scheduling information, a signaling overhead and a time delay between the BS and the RS can be reduced.

The RS transmits data to the BS according to the uplink radio allocation indicator (step S163). When the RS transmits a large amount of data to the BS, there is an advantage in that data can be transmitted without repetitively exchanging a scheduling request signal or uplink scheduling information by the use of an uplink resource allocation indicator capable of transmitting data in a pre-agreed specific amount.

By considering retransmission, the scheduling request signal may use the same transmission parameter at initial transmission and retransmission. Alternatively, a transmission parameter used at retransmission may be specified as an offset value of a transmission parameter used at initial transmission. In this manner, a signaling overhead between the RS and the BS can be reduced.

Figure 18:
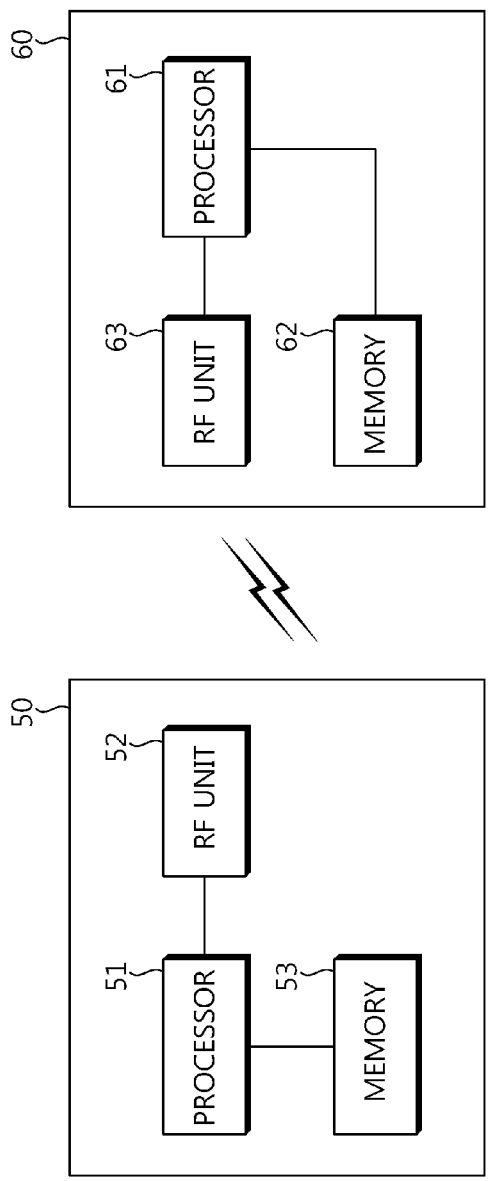
FIG. 18 is a block diagram of a base station (BS) and an RS according to an embodiment of the present invention.

FIG. 18 is a block diagram of a BS and an RS according to an embodiment of the present invention.

Referring to FIG. 18, a BS 50 includes a processor 51, a memory 53, and a radio frequency (RF) unit 52. When a scheduling request signal is received from an RS 60, the processor 51 decodes the scheduling request signal. Further, the processor 51 decodes data transmitted from the RS 60 in a subframe recognized from the decoded scheduling request signal. The processor 51 may optionally generate an uplink resource allocation indicator upon receiving the scheduling request signal and transmit the generated uplink resource allocation indicator to the RS via the RF unit 52. Layers of the radio interface protocol can be implemented by the processor 51. The memory 53 is coupled to the processor 51 and stores a variety of information for driving the processor 51. The RF unit 52 is coupled to the processor 51, and transmits and/or receives radio signals.

The RS 60 includes a processor 61, a memory 62, and an RF unit 63. The processor 61 generates a scheduling request signal, and performs a series of control processes for transmitting data to the BS 50 according to radio resource allocation information (e.g., time duration information) included in the scheduling request signal. Layers of the radio interface protocol can be implemented by the processor 61. The memory 62 is coupled to the processor 61 and stores a variety of information for driving the processor 61. The RF unit 63 is coupled to the processor 61, and transmits and/or receives radio signals.

The processors 51 and 61 may include an application-specific integrated circuit (ASIC), a separate chipset, a logic circuit, and/or a data processing unit. The memories 53 and 62 may include a read-only memory (ROM), a random access memory (RAM), a flash memory, a memory card, a storage medium, and/or other equivalent storage devices. The RF units 52 and 63 may include a base-band circuit for processing a radio signal. When the embodiment of the present invention is implemented in software, the aforementioned methods can be implemented with a module (i.e., process, function, etc.) for performing the aforementioned functions. The module may be stored in the memories 53 and 62 and may be performed by the processors 51 and 61. The memories 53 and 62 may be located inside or outside the processors 51 and 61, and may be coupled to the processors 51 and 61 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a scheduling request in a wireless communication system, the method comprising:
   transmitting a scheduling request signal by a relay station to a base station in a first subframe; and
   transmitting data by the relay station to the base station in a second subframe,
   wherein the scheduling request signal comprises allocation information indicating the second subframe in which the data is transmitted.

2. The method of claim 1, wherein each of the first subframe and the second subframe is anyone of subframes in which the relay station does not receive a signal from a relay mobile station connected to the relay station.

3. The method of claim 1, wherein the first subframe and the second subframe are subframes pre-agreed with the base station.

4. The method of claim 1, wherein the scheduling request signal is transmitted using a radio resource pre-agreed with the base station in the first subframe.

5. The method of claim 4, wherein the pre-agreed radio resource is announced by the base station to the relay station by using a higher layer signal or a physical-layer signal.

6. The method of claim 1, wherein the scheduling request signal comprises information on an allocation rule indicating in which position the second subframe is located in each radio frame.

7. The method of claim 6, wherein the scheduling request signal comprises time duration information, and the time duration information indicates a radio frame duration in which the information on the allocation rule is valid.

8. The method of claim 7, wherein the time duration information indicates a specific number of radio frames, where the specific number is predetermined between the relay station and the base station.

9. The method of claim 1, wherein the information further comprises first duration information indicating first frame duration to which the first mode is applied,
   and second duration information indicating second frame duration to which the second mode is applied.

10. The method of claim 1,
    wherein the scheduling request signal further comprises information indicating a first mode or a second mode,
    wherein, when the information indicates the first mode, only a first downlink and a first uplink between the base station and the relay station are simultaneously activated or only a second downlink and a second uplink between the relay station and a mobile station are simultaneously activated, and
    wherein, when the information indicates the second mode, only the first downlink and the second uplink are simultaneously activated or only the first uplink and the second downlink are simultaneously activated.

11. A relay station comprising:
    a radio frequency (RF) unit for transmitting and receiving radio signals; and
    a processor coupled to the RF unit, wherein the processor controls the RF unit to transmit a scheduling request signal to a base station in a first subframe and to transmit data to the base station in a second subframe, and the scheduling request signal comprises allocation information indicating the second subframe in which the data is transmitted.

12. The relay station of claim 11, wherein the information further comprises first duration information indicating first frame duration to which the first mode is applied,
    and second duration information indicating second frame duration to which the second mode is applied.

13. The relay station of claim 11,
    wherein the scheduling request signal further comprises information indicating a first mode or a second mode,
    wherein, when the information indicates the first mode, only a first downlink and a first uplink between the base station and the relay station are simultaneously activated or only a second downlink and a second uplink between the relay station and a mobile station are simultaneously activated, and wherein, when the information indicates the second mode, only the first downlink and the second uplink are simultaneously activated or only the first uplink and the second downlink are simultaneously activated.

* * * * *